United States Patent
Oottamakorn et al.

(10) Patent No.: US 7,146,425 B2
(45) Date of Patent: Dec. 5, 2006

(54) MEASUREMENT-BASED ADMISSION CONTROL UTILIZING EFFECTIVE ENVELOPES AND SERVICE CURVES

(75) Inventors: Chaiwat Oottamakorn, Brooklyn, NY (US); Dennis Bushmitch, Somerset, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 711 days.

(21) Appl. No.: 09/748,557

(22) Filed: Dec. 22, 2000

(65) Prior Publication Data

US 2002/0120767 A1    Aug. 29, 2002

(51) Int. Cl.
*G06F 15/16* (2006.01)
*H04L 12/26* (2006.01)

(52) U.S. Cl. .............. 709/235; 370/230; 370/232
(58) Field of Classification Search .......... 709/223, 709/233, 234, 235, 238, 240, 241, 242, 249; 370/230–5, 464, 480, 230–232
See application file for complete search history.

(56) References Cited

U.S. PATENT DOCUMENTS

| | | | | |
|---|---|---|---|---|
| 5,664,170 A | * | 9/1997 | Taylor | 709/220 |
| 5,872,771 A | * | 2/1999 | Park et al. | 370/252 |
| 6,490,249 B1 | * | 12/2002 | Aboul-Magd et al. | 370/232 |
| 6,657,987 B1 | * | 12/2003 | Kumar et al. | 370/346 |
| 6,693,909 B1 | * | 2/2004 | Mo et al. | 370/392 |
| 2002/0073224 A1 | * | 6/2002 | Varma et al. | 709/233 |

OTHER PUBLICATIONS

Georgiadis et al., "Efficient support of delay and rate guarantees in an internet", 1996, ISBN:0-89791-790-1.*
R. L. Cruz, "Quality of Service Guarnantees in Virtual Circuit Switched Networks", Mar. 1995.*
S. Keshav "An Engineering Approach to Computer Networking", 1997, pp. 455-461 ISBN 0-201-63442-2.*
C. Cetinkaya, E.W. Knightly, "Egress Admission Control," IEEE Infocom 2000, pp. 1471-1480.
R. Boorstyn, A. Burchard, J. Lieberherr, C. Oottamakorn, "Effective Envelopes: Statistical Bounds on Multiplexed Traffic in Packet Networks", IEEE Infocom 2000, pp. 1223-1232.
H. Sariowan, R.L. Cruz, G.C. Polyzos, "Scheduling for Quality of Service Guarantees via Service Curves", IEEE 1995, pp. 512-520.

* cited by examiner

*Primary Examiner*—John Follansbee
*Assistant Examiner*—Yasin Barqadle
(74) *Attorney, Agent, or Firm*—Harness, Dickey & Pierce, PLC

(57) ABSTRACT

The admission control algorithm implements measurement-based connection admission control using effective envelopes of an arriving traffic aggregate and the service curves of the corresponding departing traffic aggregate. The approach provides the statistical service guarantees to a variety of service classes. According to the admission control algorithm, arriving traffic is admitted if the sum of the effective envelopes of the arriving traffic entering a network and admitted traffic currently in the network is less than or equal to the service curve.

10 Claims, 7 Drawing Sheets

(a) Arriving envelope.

(b) Arival traffic rate.

(a) Service envelope (b) Service rate

MEASUREMENT-BASED ADMISSION CONTROL UTILIZING EFFECTIVE ENVELOPES AND SERVICE CURVES

BACKGROUND AND SUMMARY OF THE INVENTION

The present invention relates generally to network-based communication architecture. More particularly, the invention relates to providing controlled quality of service in packet-based networks through admission control.

Currently much of the Internet is designed to provide "best effort" service. The Internet Protocol (IP) is designed to deliver packets of information to an ultimate destination through any available internal links that enable delivery. The actual time it takes to deliver these packets depends on the route taken and the traffic congestion encountered en route. The original design of the Internet Protocol focused on providing ultimate delivery, with the actual time to achieve delivery being only a secondary consideration.

As the uses for the Internet have grown, and as Internet traffic has expanded geometrically, the original emphasis on delivery over timing is being challenged. With multicast applications and streaming audio and video applications growing in popularity, packet delivery time has become a central focus. Quality of Service (QoS) is a term often used to describe the degree to which a communications network provides reliability, availability, and timely throughput. Quality of service addresses issues such as transmission speed, timeliness of packet delivery, amount of jitter a network introduces into packet streams, and the probability of outright packet loss. As businesses begin to rely more and more on their Internet presence, some have expressed willingness to pay more for higher quality of service because the higher quality of service translates directly into a smoother, more responsive experience for their customers. Some Internet Service Providers thus offer different service level agreements through which they commit to provide different levels of service quality at different fee rates.

There are many proposals for improving quality of service in packet-switched networks such as the Internet. Quality of service may be improved at the individual router level by making the routers faster and more intelligent. However, this also increases system cost. Other proposals address the quality of service issue at the network model level. At the network model level, the performance of individual routers are largely ignored; focus instead shifts to the aggregate performance of all routers in the network. One popular approach is to consider the aggregate network only in terms of its outer boundary or end-to-end performance. Using such an analytical approach, the performance of the entire network, and the quality of service it provides, can be largely controlled by the behavior of the routers occupying the edge of the network (that is, the routers at the ingress and egress points).

There are several end-to-end network models for controlling quality of service (QoS) in popular use today. Among the leading models are Integrated Services (IntServ), Multi-Protocol Label Switching (MPLS), and Differentiated Services (DiffServ). IntServ supports a per flow quality of service guarantee. It employs a relatively complex architecture in which resources are reserved by means of a signaling protocol that sets up paths and reserves resources. MPLS provides another quality of service guarantee approach that focuses on packet forwarding. Packets are assigned labels at the ingress of an MPLS-compatible domain. Subsequent classification, forwarding, and services for the packets are then based on those labels.

Models such as IntServ and MPLS address QoS on a per connection basis and can present scalability difficulties. To provide better scalability, other models have been proposed that address QoS on a traffic aggregate basis. DiffServ is one example of such a model. DiffServ provides quality of service guarantees to packet aggregates by marking packets differently to create different packet classes/aggregates that are entitled to different quality of service handling.

For the most part, aggregate traffic-based network models share a number of common concepts. They begin from a premise that the network can be characterized as having edge and core routers. The edge routers accept customer traffic (i.e., packets from any source outside the network). The core routers provide transit packet forwarding services among other core routers and/or edge routers. The edge routers control ingress of traffic and thus perform an important admission control function, by permitting or declining requests by outside traffic to enter the network. With the ultimate traffic flow being controlled by the edge routers through admission control, the core routers simply need to differentiate traffic insofar as necessary to cope with transient congestion within the network itself. The network models may employ statistical multiplexing to maximize utilization of the core router resources.

Predicting and controlling traffic flow through a network at an aggregate level is a very complex problem. Admission control algorithms that overly restrict ingress waste internal core router resources. On the other hand, admission control algorithms that are too lax can flood the network with too much traffic, resulting in severe drops in quality of service. Numerous admission control algorithms have been proposed and while some have been quite ingenious, there remains a great deal of room for improvement.

For example, Centinkaya and Knightly, in an article entitled "Egress Admission Control," IEEE Info. Comm. 2000, describe a framework for scalable quality of service provisioning in which admission control decisions are made at the egress routers based solely on aggregate measurements obtained at the egress router. They introduce a measurement-based service envelope as a way to adaptively describe the end-to-end service received by a traffic class.

For a more complete understanding of the invention, its objects and advantages, refer to the following description and to the accompanying drawings.

DESCRIPTION OF THE PREFERRED EMBODIMENT

A measurement-based admission control algorithm is based on the global effective envelopes of an arriving traffic aggregate and upon the service curves of the corresponding departing traffic aggregate. Such an admission control algorithm is well adapted to a variety of different network models. Although the algorithm will be principally described in the context of a multi-router network, the concepts employed are equally applicable to autonomous network systems and even switching devices. In a switching device, for example, the switch hardware/software provides for several input ports and output ports. The present invention may be used to control traffic flow among these input and output ports. Therefore, this algorithm is applicable to "networks" of different architectural granularities, ranging from single-device switches to large, multiple-device computer network domains.

Figure 1:
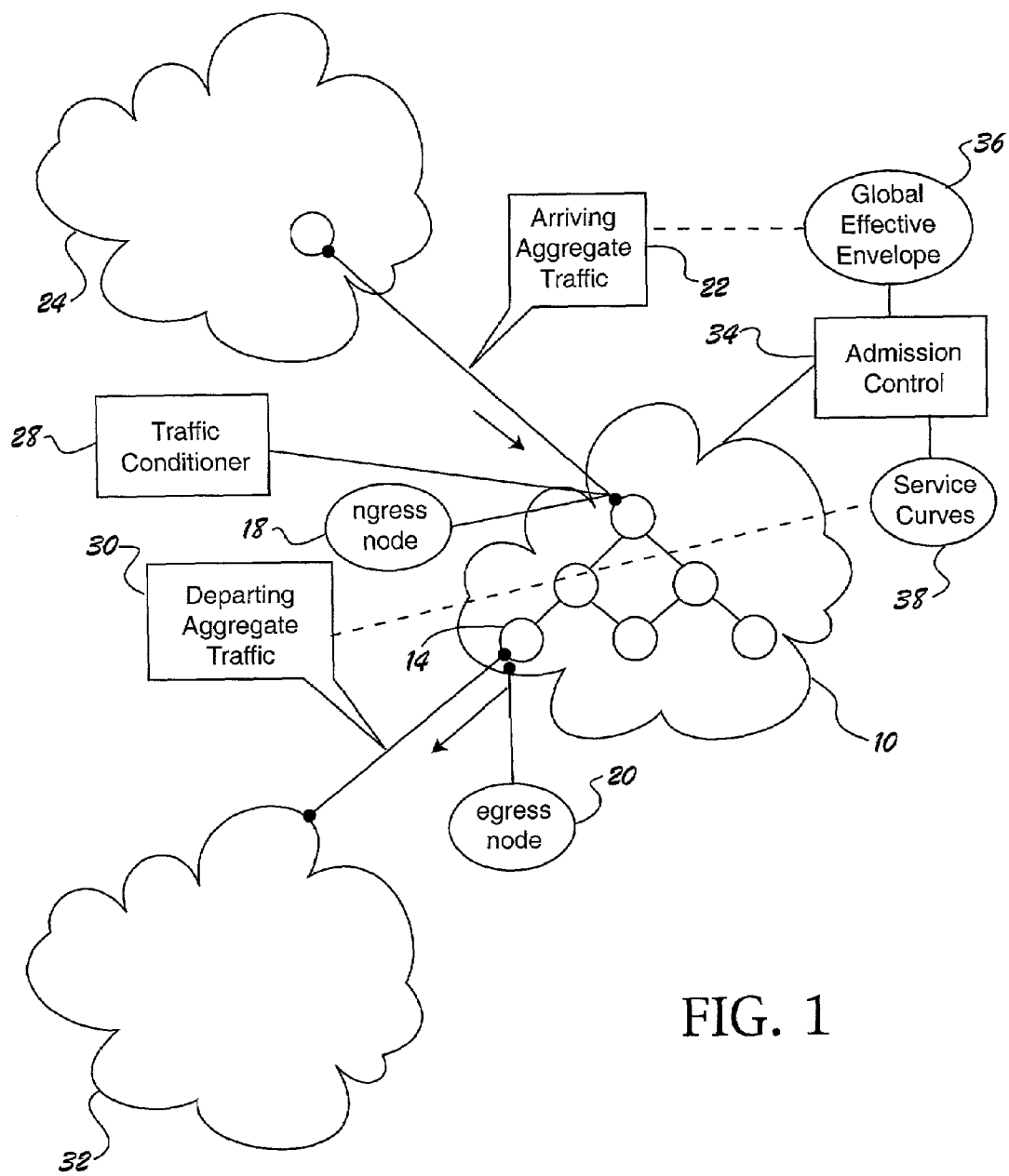
FIG. 1 is a network diagram illustrating an exemplary end-to-end network model, useful in understanding the admission control algorithm of the present invention.

Referring to FIG. 1, an exemplary network is illustrated at 10. Network 10 includes a plurality of edge routers, such as router 12 and router 14, that are in turn connected to a plurality of core routers 16. For purposes of illustration, edge router 12 serves as the ingress node 18, and edge router 14 serves as the egress node 20. Arriving traffic enters through the ingress node 18 and departing traffic leaves through the egress node 20, as illustrated.

For purposes of illustration, arriving aggregate traffic 22 comes from a second network 24 via edge router 28. For purposes of illustration, it will be assumed that a traffic conditioner or regulator function 28 limits the flow of arriving aggregate traffic 22 to within predefined bounds. The traffic conditioner 28 may be located within the second network 24 (such as in edge router 26). The traffic conditioner or regulator 28 may be implemented at the ingress node 18 to force arriving traffic to comply with the traffic specification submitted by the sender. The traffic conditioner or regulator 28 may be modeled as a leaky bucket that provides a simple metering function. Alternatively, the traffic conditioner 28 may provide more sophisticated traffic shaping functions where the temporal characteristics of a traffic class are selectively modified by delaying local packet forwarding. For purposes of illustration, departing aggregate traffic 30 exits edge router 14 and enters network 32.

Network 10 implements an admission control function 34 to determine which of the packets of arriving aggregate traffic 22 are admitted to the network 10 and which are blocked. The admission control function 34 may be localized in a single router, such as edge router 12. Alternatively, the admission control function can be distributed across the network, with the function being performed by multiple routers within the network 10. The admission control function 34 implements an admission control algorithm that is based upon a global effective envelope 36 of the arriving aggregate traffic 22 and upon service curves 38 of the departing aggregate traffic 30.

Figure 2:
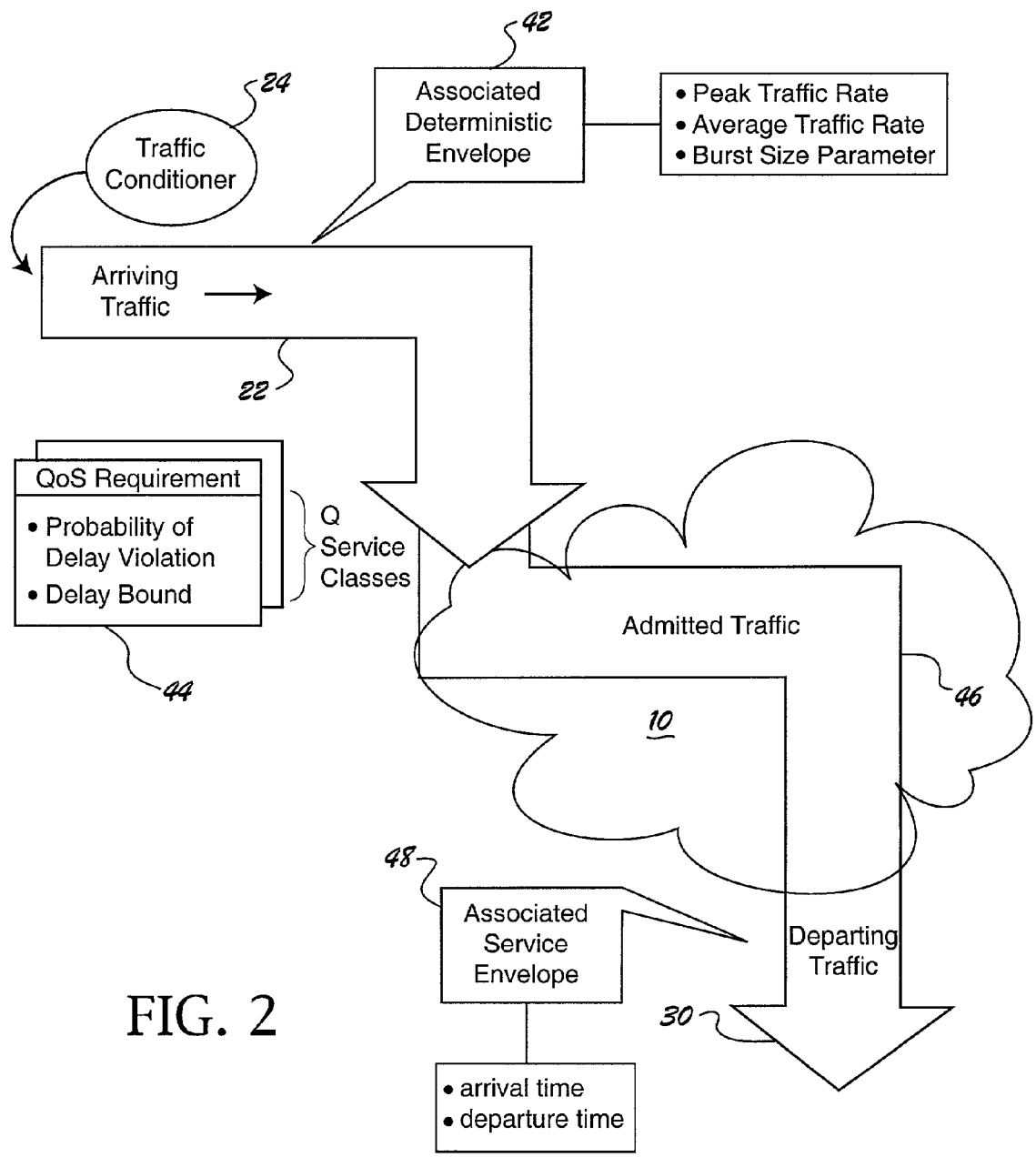
FIG. 2 is a block diagram illustrating the pertinent parameters associated with arriving traffic and admitted traffic in a network.

FIG. 2 illustrates network 10 with arriving traffic 22, admitted traffic 46, and departing traffic 30 being shown in greater detail. The figure introduces terms that will be useful in understanding the algorithm.

Associated with arriving traffic 22 is a deterministic envelope 42. The deterministic envelope may be characterized in terms of three variables: peak traffic rate, average traffic rate, and burst size parameter. The arriving traffic 22 also is assumed to have an associated quality of service requirement 44. Typically each class of service would have its own quality of service requirement. Thus multiple QoS requirements are illustrated at 44 in FIG. 2. The QoS requirements may be characterized by the following variables: probability of delay violation and delay bound.

The admitted traffic 46 may be differentiated from the arriving traffic 22, in that the admitted traffic 46 has already passed the admission control point and is thus currently flowing in network 10. When the admitted traffic 46 leaves network 10, it is called departing traffic 30. The departing traffic 30 has associated with it a service curve or service envelope 48 that is measured by monitoring each packet's arrival time and departure time.

Figure 3A:
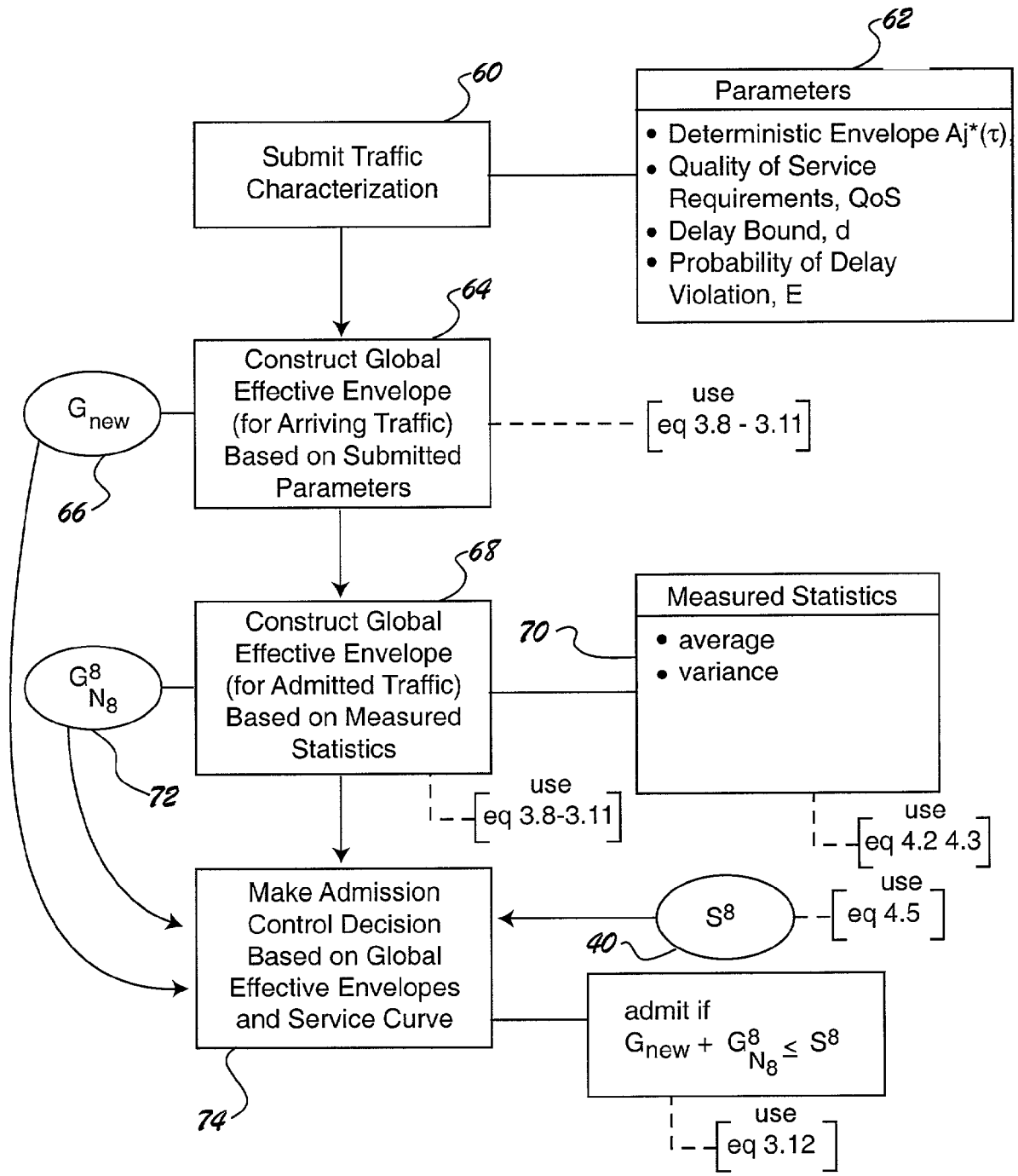
FIG. 3a is a flowchart diagram of the presently preferred admission control algorithm, illustrating global effective envelopes.
Figure 3B:
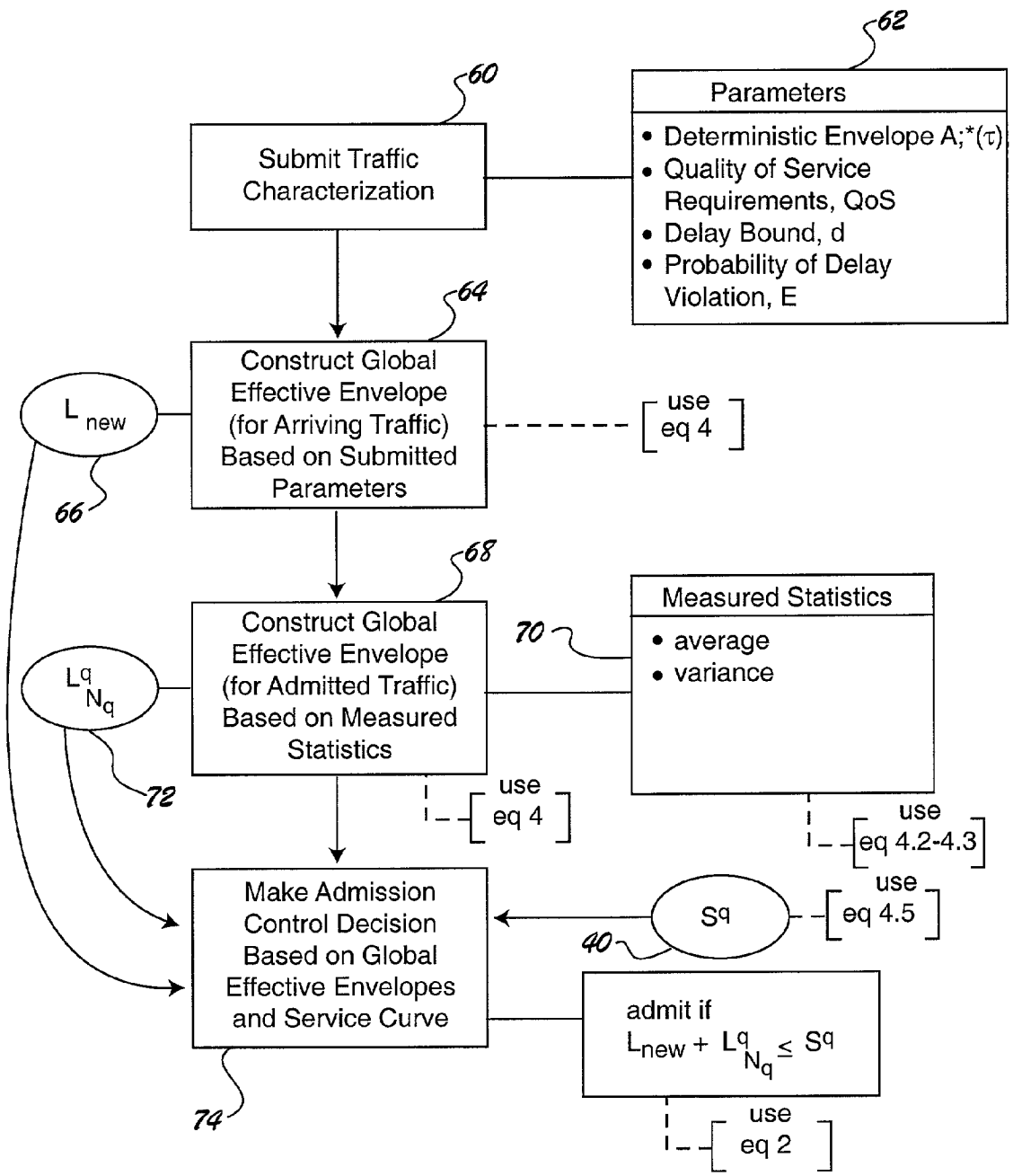
FIG. 3b is a similar flowchart diagram of the presently preferred admission control algorithm, illustrating local effective envelopes.

One variation of the admission control algorithm uses the associated deterministic envelope 42 of the arriving traffic 22 and the associated service envelope 48 of the departing traffic 30 in making a decision whether to admit or deny arriving traffic 22. FIGS. 3a and 3b show the presently preferred algorithm in flowchart form. A more rigorous mathematical derivation of the preferred algorithm is presented below. The flowcharts of FIGS. 3a and 3b make reference to specific equations from the detailed mathematical derivation, where applicable. A discussion of the flowchart will be presented first, as a way of introducing the detailed mathematical derivation that follows. Specifically, FIG. 3a applies to global effective envelopes; FIG. 3b applies to local effective envelopes. The content of these two figures is similar; hence a detailed discussion of FIG. 3a is presented below and may be considered applicable to FIG. 3b, except where the mathematical derivation differs, as will be evident by comparing the Figures.

Referring to FIG. 3a, the preferred algorithm begins at step 60 with a request to be admitted to the network. As part of the request, the incoming traffic submits its traffic characterization, which is expressed in terms of characterization parameters 62. The specific parameters used by the presently preferred embodiment are:

Deterministic Envelope $A_j^*(\tau)$;

Quality of Service Requirements, QoS;

Delay Bound, d;

Probability of Delay Violation, $\epsilon$.

Next, at step 64, the algorithm constructs a global effective envelope for the arriving traffic, based on the submitted parameters 62. In the mathematical derivation that follows, the global effective envelope for arriving traffic is characterized as $G_{new}$. The $G_{new}$ envelope is depicted in FIG. 3 at 66. As indicated by the dashed lines and bracketed notation, step 64 is performed using equations 3.8–3.11.

The algorithm continues at step 68, where a global effective envelope for the admitted traffic is constructed based on measured statistics. Specifically, the measured statistics, listed at 70, include the average and the variance of the amount of arriving aggregate traffic. In the detailed mathematical derivation which follows, the global effective envelope for admitted traffic is designated as $G_{N_q}^q$. In FIG. 3, this $G_{N_q}^q$ envelope is shown at 72.

The final admission control decision, step 74, is made based on an analysis of both global effective envelopes 66 and 72, along with the service curve 40 calculated using equation 4.5 and the algorithm shown in Table 1 below. Specifically, the admission control decision will admit incoming traffic if:

$$G_{new} + G_{N_q}^q \leq S^q$$

For a more precise statement of the above admission control condition, see the following detailed description and, in particular, Eqn. (3.12).

Detailed Description of Preferred Admission Control Algorithm

A detailed description of the preferred algorithm will now be provided below. For purposes of illustration, a Differentiated Service (DS) or Diffserv architecture will be assumed. The invention is not limited to the DS architecture inasmuch as the admission control algorithm of the invention may be used with a variety of network architectures.

In order to provide Quality of Service (QoS), the Integrated Services (IS) architecture uses a signaling protocol to set up resource reservations at all routers along the path. Since this approach requires that all routers have to keep per-flow state and process the per-flow resource reservations, this approach has known scalability problems. Differentiated Service (DS) is another approach to provide QoS, but without the restriction on scalability. Routers need only implement scheduling and buffering mechanisms and apply them based on the DS Code Point (DSCP) presented in the header of arriving packets. The end-to-end QoS service across several domains is built by combining the per domain behaviors (PDBs) of individual DS domains. PDBs, an active area of research, are constructed by an appropriate deployment of per-hop forwarding behaviors (PHBs). Several DS domains can exist within a single autonomous system (AS). DS addresses scalability by providing QoS guarantees on an aggregate traffic level.

As discussed above, one of the critical requirements for service provisoining across a DS domain is the presence of an effective Connection Admission Control (CAC). Such admission control can be utilized while establishing dynamic service level agreements (SLAs) for premium service across DS network, or consulted upon re-negotiations of static SLAs. A Bandwidth Broker (BB) entity of a DS domain is a typical place for such admission control. The difficulty involved in designing an effective CAC is that many solutions lead toward topology-dependent implementations, thus limiting their scope and increasing their complexity.

To implement admission control for DS without scalability problems, several researchers have proposed various forms of Endpoint CAC. In this design, the endpoints of a DS domain (ingress/egress routers) perform admission control and resource management. The routers measure traffic in the network to detect the level of available resources and admit a new connection if, and only if, the detected level of resource is sufficiently high.

The preferred embodiment provides a measurement-based CAC algorithm, which provides statistical QoS guarantees on a traffic aggregate level in a DS domain. The ingress traffic arriving at the boundary of a DS domain is assumed to be conditioned by the upstream domains, policed by our domain to adhere to the rules of an established SLA, and further marked with the appropriate DSCP. Leaky-bucket based policers, shapers and markers are widely proposed. As the DS architecture extends some PDB for a traffic aggregate, we call this traffic aggregate a class in a subsequent discussion (different from DS class). We target the PDBs, which offer delay guarantees to a classified traffic aggregate given both delay and delay violation probability. We describe the deterministic envelopes, i.e., arriving traffic envelopes and service envelopes, and the bound on performance characteristics that can be obtained from those envelopes. We then derive a measurement-based CAC to establish dynamic SLA and provide statistical guarantees for a variety of service classes by exploiting the statistical traffic envelopes, called global effective envelopes and service curves. To obtain these envelopes, we use the measurement approach. The measurement of the service curves allows our admission control condition to work without the knowledge of the topology of the DS domain and cross traffic in the domain.

Let us consider a traffic arriving to a network domain. The traffic enters the domain at an ingress node 18 and destines to an egress node 20 (see FIG. 1). In the following we consider a continuous-time fluid flow traffic model. An arriving traffic from different flows is differentiated by its QoS requirements. Here we consider the probability of delay violation and the delay bound as the QoS requirements of interest. An arriving traffic with the same QoS requirements, i.e., the same delay bound and probability of delay violation requirements, is treated as a service class. Hence, traffic arriving to the domain is partitioned into Q classes. We use $N_q$ to denote the number of flows within a class q.

The arriving traffic from the flow j of the class q in an interval $(t_1, t_2)$ is denoted as $A_j^q(t_1, t_2)$. We assume that traffic arrival from each flow j is regulated by a traffic conditioner and upper bounded by a deterministic subadditive envelope $A_j^{q*}(\tau)$ as follows:

$$A_j^q(t, t+\tau) \leq A_j^{q*}(\tau) \quad \forall t \geq 0, \forall \tau \geq 0. \tag{2.1}$$

The arriving traffic is characterized by the deterministic envelope with a set of parameters. The most commonly used traffic regulators are leaky buckets with a peak rate enforcer. The traffic on flow j is characterized then by three parameters $(P_j, \sigma_j, \rho_j)$ with a deterministic envelope given by $$A_j^{q*}(\tau) = \min\{P_j^q \tau, \sigma_j^q + \rho_j^q \tau\} \quad \forall \tau \geq 0 \tag{2.2}$$

where $P_j^q \geq \rho_j^q$ is the peak traffic rate, $\rho_j^q$ is the average traffic rate, and $\sigma_j^q$ is the burst size parameter.

As a generalization of the peak-rate enforced leaky bucket, the traffic on flow j may be characterized by a set of parameters $\{\sigma_{jk}^q, \rho_{jk}^q\}_{k=1, \ldots, k_j}$ with a deterministic envelope $$A_j^{q*}(\tau) = \min_{k=1, \ldots, K_j^q} \{\sigma_{jk}^q + \rho_{jk}^q \tau\} \tag{2.3}$$

where $K_j^q$ is the number of leaky-bucket pairs.

It is also noted that flows from the same service class can be characterized by different deterministic envelopes, but still have the same QoS requirements.

We use $A_j^{qout}(t_1, t_2)$ to denote the traffic from flow j of the class q leaving the domain at the egress node in an interval $(t_1, t_2)$. We then define the aggregate traffic of class q as follows: the aggregate of arriving traffic $$A_{Nq}(t_1, t_2) = \sum_{j \in N_q} A_j^q(t_1, t_2)$$

and the aggregate of departing traffic $$A_{Nq}^{out}(t_1, t_2) = \sum_{j \in N_q} A_j^{qout}(t_1, t_2).$$

For a time interval of length $\beta$, we define the empirical envelope, $E_{Nq}(\tau,\beta)$ of an arriving aggregate $N_q$ of flows from class q, which is the upper bound of the arriving aggregate in any time interval of length $\tau \leq \beta$ as follows:

$$E_{Nq}(\tau; \beta) = \sup_{(t,t+\tau) \subseteq \beta} A_{Nq}(t, t+\tau) \quad (2.4)$$

In the following, we will focus our discussion on the aggregate traffic of a single service class and drop the index 'q'. We will introduce the definition of a service curve and its application. We assume that there is no traffic in the domain at time t=0. Therefore, for an aggregate traffic, the amount of backlogged traffic in the domain at any time t, B(t), is given by $$B(t) = A_N(0, t) - A_N^{out}(0, t) \geq 0. \quad (2.5)$$

Also the ingress-to-egress delay suffered by the aggregate traffic at time t is denoted by d(t) and is defined as follows:

$$d(t)=\min\{z:z \geq 0 \text{ and } A_N(0,t) \leq A_N^{out}(0,t+z)\} \quad (2.6)$$

Definition of Service Curve

Let S(•) be a non-decreasing function, with S(0)=0. We say that the domain guarantees the service curve S(•) for the aggregate traffic if for any time t, there exists $s \leq t$ such that B(s)=0 and $A_N^{out}(s,t) \geq S(t-s)$.

It can be seen that S(t−s) specifies the lower bound of the amount of the aggregate traffic needed to be served and depart from the domain during some interval (s,t), where the domain is empty at time s.

From the definition of service curve, the upper bound of delay can be obtained as follows. Consider a busy period of length $\beta$. Let s denote the starting time of the busy period, that is, B(s)=0 and $A_N(0,s)=A_N^{out}(0,s)$. We assume that the domain guarantees the service curve S(•), that is $A_N^{out}(s,t) \geq S(t-s)$, where $s \leq t+d \leq \beta$. From the definition of service curve, we have $A_N^{out}(s,t+d)=A_N^{out}(0,t+d)-A_N(0,s) \geq S(t+d-s)$. From Eqn. (2.6), thus, $A_N(0,t) \geq A_N^{out}(0,t+d) \geq A_N(0,s)+S(t+d-s)$. Hence, from Eqn. (2.4).

$$A_N(s,t) \leq E_N(t-s;\beta) \geq S(t+d-s) \quad (2.7)$$

Defining $\tau = t-s$, it follows that, for all time $t \geq 0$, the delay defined in Eqn. (2.6) is upper bounded as follows:

$$d(t) \leq \min\{z : z \geq 0 \text{ and } E_N(\tau, \beta) \leq S(\tau + z)\} \quad (2.8)$$
$$\leq \max_{0 \leq \tau \leq B} \min\{z : z \geq 0 \text{ and } E_N(\tau; \beta) \leq S(\tau + z)\}$$

Figure 4:
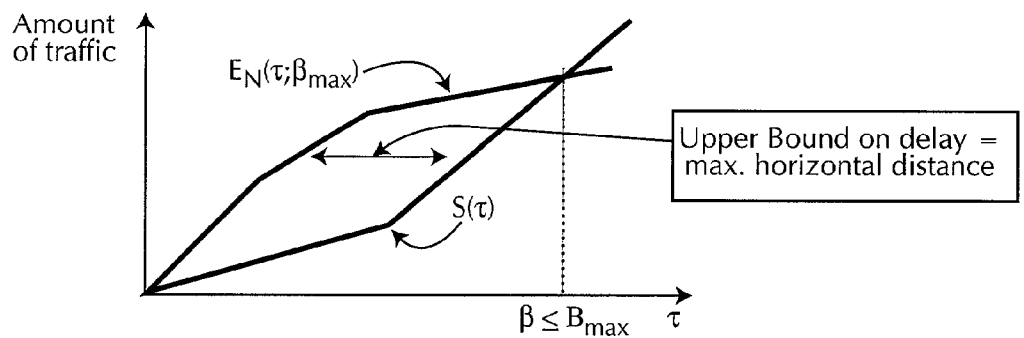
FIG. 4 is a graph illustrating the calculation of delay bound.

From Eqn. (2.8), it is noted that the upper bound on delay is the maximum horizontal distance between the arriving aggregate envelope $(E_N(\tau,\beta))$ and the service curve $S(\tau)$ (see FIG. 4). It is also noted that $\beta$ is upper bounded by $\beta_{max}$, which is the maximum busy period of the aggregate traffic and can be determined as:

$$\beta_{max} = \inf\left\{\tau \geq 0 \middle| \sum_{j \in N} A_j^*(\tau) \leq S(\tau)\right\}.$$

Therefore, we will use $\beta = \beta_{max}$ in the following discussions.

The preferred admission control algorithm exploits the deterministic envelopes and the service envelopes to obtain the upper bound of the delay experienced by an arriving traffic based on the worst-case scenario where it is assumed that all flows send traffic with their peak rate simultaneously.

In the next section, following the concept of the described envelopes, we will derive a statistical service where a small portion of traffic is allowed to violate the delay QoS requirements. We will use so called global effective envelopes to characterize arriving aggregate traffic for each class. Using these envelopes allows us to derive a CAC for statistical services which can be created in the same fashion as for deterministic services.

Probabilistic Guarantees with Effective Envelopes and Service Curves

In this section, we derive the probability of delay violation based on the upper bound of the delay shown in the previous section. We then obtain an admission control condition for a single service class by applying the definition of local and global effective envelopes presented in R. Boorstyn, A. Burchard, J. Liebeherr, and C. Oottamakom, Effective envelopes: Statistical bounds on multiplexed traffic in packet networks, *Proceedings of IEEE Info. Comm.* 2000, Tel Aviv, Israel, March 2000 (hereinafter "Boorstyn, et al."). We finally discuss the admission control conditions for multiple service classes.

Probabilistic Guarantees with Local Effective Envelopes and Service Curves

Again we will first consider a single service class, allowing us to drop the index 'q'. An aggregate of arriving traffic from the same service class $A_N(t_1,t_2)$ has the same probability of delay violation, $\epsilon$, and delay bound requirement, d. $A_N(t_1,t_2)$ are upper bounded by a family of nonnegative random processes $A_N(t_1,t_2)$, which have the following properties: (1) Stationarity: the statistical properties of $A_N(t_1,t_2)$ do not change with time, and (2) Independence: The $A_N(t_1,t_2)$ are stochastically independent among all service classes.

Let $D_N(\tau)$ denote the ingress-to-egress delay experienced by a bit of an aggregate traffic of the N flows arriving at the domain at time $\tau$. We assume that $D_N(\tau)$ is a random variable. For a given delay bound d, the domain guarantees that the ingress-to-egress delay of any arriving bit will not exceed the delay bound d; that is, for all time $t \geq 0$, $0 \leq \tau \leq B_{max}$, from Eqn. (2.8), $D_N(\tau)=\min\{z:z \geq 0 \text{ and } A_N(t, t+\tau) \leq S(\tau+z)\} \leq d$ or, for all time $t \geq 0, 0 \leq \tau \leq B_{max}$, $A_N(t,t+\tau) \leq S(\tau+d)$. The delay violation occurs if $\exists D_N(\tau)$ such that $$D_N(\tau) \geq d$$

or, $\exists \tau$ such that $$A_N(t,t+\tau) > S(\tau+d)$$

With Eqn. (2.8), the probability that the arriving traffic experiences a delay violation is required to be bounded by $\epsilon$ and we have, for all time $t \geq 0, 0 \leq \tau \leq B_{max}$, $$Pr[D_N(\tau)>d]=Pr[A_N(t,t+\tau)>S(\tau+d)] \leq \epsilon \quad (1)$$

When a set of new flows requests the same service guarantees from a DS domain, the CAC uses the admission control test to ensure that the requested service guarantees and other flows from all service classes can be simultaneously satisfied. From Eqn. (1), we can obtain the admission control condition for a single service class by using the definition of local effective envelope as follows:

Definition (Local Effective Envelope)

A local effective envelope for $A_N(t,t+\tau)$ is a function $L_N$ that satisfies for all $\tau \geq 0$ and all t $$Pr[A_N(t,t+\tau) \leq L_N(\tau;\epsilon)] \geq 1-\epsilon$$

It can be seen that a local effective envelope provides a probabilistic bound for the aggregate traffic $A_N(t,t+\tau)$ for any specific time interval of length $\tau$.

Lemma

Given a set of flows that is partitioned into M classes, each class contains $N_m$ flows with aggregate arrivals $A_{N_m}$. Let $L_{N_m}(\tau;\epsilon)$ be the local effective envelope for class m. Then the following inequality holds: given x, $$\text{If } \sum_m L_{N_m}(\tau;\varepsilon) \leq x, \text{ then for all } t, Pr\left[\sum_m A_{N_m}(t, t+\tau) > x\right] \leq M \cdot \varepsilon.$$

We divide flows from the same service class into two categories, i.e. M=2. The first group is the set of flows, N, that are already admitted to the domain. The second group is the new set of flows, K, requesting the QoS service from a DS domain. We denote $L_N$ as the local effective envelope of the first group and $L_{new}$ as the local effective envelope of the second group.

Admission Control Condition for a Single Service Class

Using the definition of the local effective envelope and the lemma, from Eqn. (1) we have that the arriving traffic has a delay violation with probability $<\epsilon$ if $$L_N(\tau,\epsilon/2)+L_{new}(\tau;\epsilon/2) \leq S(\tau+d), \text{ for } 0 \leq \tau \leq B_{max} \quad (2)$$

If, for the same service class, the set of new flows are regulated by different deterministic envelopes $A_j^*$, each set of flows sharing the same $A_j^*$ have a different envelope $L_{new}^j(\bullet;\epsilon_j)$, where $$\sum_j \varepsilon_j = \varepsilon/2.$$

Therefore Eqn. (2) becomes $$L_N(\tau;\varepsilon/2) + \sum_j L_{new}^j(\tau;\varepsilon_j) \leq S(\tau+d), \text{ for } 0 \leq \tau \leq B_{max} \quad (3)$$

The CAC in Eqn. (2) does not depend on the topology of the domain and the scheduling algorithms within the domain, but the measurement-based traffic-characterized envelopes, which can be measured at an ingress and an egress node in a DS domain.

Local Effective Envelope using Measured Moment

We consider a set of admitted flows, N. We characterize the distribution of the aggregate traffic using the Central Limit theorem, which does not require knowledge of the underlying distributions of each flow. An approximate local effective envelope of the aggregate traffic can be obtained from the Central Limit Theorem as follows [1]. From the definition of the local effective envelope, we set $Pr[A_N(t,t+\tau) \geq x] = \epsilon/2$ and we obtain, $$L_N(\tau;\epsilon/2) = \overline{X(\tau)} + z\sigma(\tau) \quad (4)$$

where z has the approximate value $z=\sqrt{\log(2\pi\epsilon)}$, and $\overline{X(\tau)}$ and $\sigma^2(\tau)$ are measured average and variance of the amount of aggregate traffic, respectively. We will discuss those measurements in the next section.

Since the number of new flows may be few, the Central Limit theorem may not be the appropriate choice for constructing their local effective envelope, i.e., the bound obtained may not be tight enough. Instead, we will use the Chernoff bound, which provides a more rigorous bound on the aggregate traffic. The local effective envelope of a set of new flows, K, can then be obtained by using the Chernoff bound, and is given as follow:

Recall the Chernoff bound for a random variable Y:

$$Pr[Y \geq y] \leq e^{-sy}E[e^{sY}] \forall s \geq 0 \quad (5)$$

We have $$Pr[A_K(t,t+\tau) \geq Kx] \leq e^{-K,x,s}M_K(s,\tau), \quad (6)$$

where $M_K(s,\tau)$ is the moment generating function of the aggregate traffic.

In Boorstyn, et al., $M_K(s,\tau)$ is derived and given in terms of the deterministic envelopes of the flows, which are the leaky bucket function in our case. s is chosen so that Eqn. (6) is minimal. These values of s and $M_K(s,\tau)$ yield $$L_{new}(\tau;\epsilon/2) = K\min\{x, A_K^*(\tau)\} \quad (7)$$

$$\left(\frac{\rho\tau}{x}\right)^{\frac{x}{A_K^*(\tau)}} \left(\frac{A_K^*(\tau)-\rho\tau}{A_K^*(\tau)-x}\right)^{1-\frac{x}{A_K^*(\tau)}} \leq (\varepsilon/2)^{1/K} \quad (8)$$

where $A_K^*(\tau)$ is a deterministic envelope for each new flow.

Admission Control Condition for Multiple Service Classes

The admission control condition in Eqn. (2) does not guarantee that QoS requirements of other service classes using the same ingress-to-egress path will be satisfied if a new set of flows is admitted into the domain. To be able to provide that guarantee, without loss of generality, we assume that the new flows have the highest priority, and we test the admission control condition for each of the service classes. This can be shown as follows. For each service class we obtain an arriving aggregate traffic envelope $L_{N_q}^q(\tau;\epsilon_q/2)$ and a service envelope $S^q(\bullet)$. From Eqn. (2), the new flows with an arriving envelope $L_{new}(\tau;\epsilon_q/2)$ will be admitted if the following condition is satisfied: for all service classes q, $$L_{N_q}^q(\tau;\epsilon_q/2)+L_{new}(\tau;\epsilon_q/2) \leq S^q(\tau+d_q), \text{ for } 0 \leq \tau \leq B_{max} \quad (9)$$

In this section we show our CAC, which depends on the measurement-based envelopes ($L_N(\bullet;\epsilon)$ and $S(\bullet)$). In the next section we show how to obtain these envelopes.

Probabilistic Guarantees with Global Effective Envelopes and Service Curves

In this section, we derive the probability of delay violation based on the upper bound of the delay shown in the previous section. We then obtain an admission control condition for a single service class by applying the definition of global effective envelope presented in Boorstyn, et al. We finally discuss the admission control conditions for multiple service classes.

Again we will first consider a single service class and drop the index 'q'. An aggregate of arriving traffic from the same service class in the interval $(t_1,t_2)$, $A_N(t_1,t_2)$, has the same QoS requirements: probability of delay violation $\epsilon$ and delay bound requirement d. $A_N(t_1,t_2)$ is characterized by a family of nonnegative random processes, which have the following properties: (1) Stationarity: the statistical properties of $A_N(t_1,t_2)$ do not change with time, and (2) Independence: The $A_N(t_1,t_2)$ are stochastically independent among all service classes. Consider an interval of length of the maximum busy period $\beta$. Let $D_N(t)$ again denote the ingress-to-egress delay experienced by a bit of an aggregate traffic of the N flows arriving at the domain at time t during the busy period. We assume that $D_N(t)$ is a random variable.

For a given delay bound d, the domain guarantees that the ingress-to-egress delay of any arriving bit will not exceed the delay bound d; that is, from Eqn. (2.8), for all $\tau$, $0 \leq \tau \leq \beta$, $$D_N(t) = \min\left\{z : z \geq 0 \text{ and } \sup_{(t,t+\tau) \subseteq \beta} A_N(t, t+\tau) \leq S(\tau+z)\right\} \leq d \quad (3.1)$$

or, for all $\tau$, $0 \leq \tau \leq \beta$, $$\sup_{(t,t+\tau) \subseteq \beta} A_N(t, t+\tau) = E_N(\tau; \beta) \leq S(\tau+d). \quad (3.2)$$

The delay violation occurs if $\exists D_N(t)$ such that $$D_N(t) \geq d$$

or, $\exists t, \tau$ such that $$\sup_{(t,t+\tau) \subseteq \beta} A_N(t, t+\tau) > S(\tau+d)$$

With Eqn. (3.2), the probability that the arriving traffic experiences the delay violation is required to be bounded by $\epsilon$ and we then have $$Pr[D_N(t) \leq d, \forall t,\tau] = Pr[E_N(\tau;\beta) \leq S(t+d), \text{ for all } \tau, 0 \leq \tau \leq \beta] \leq 1-\epsilon \quad (3.4)$$

Suppose a set of new flows requests the same service guarantees from a DS domain. The CAC uses the admission control test to ensure that the requested service guarantees and other flows from all service classes can be simultaneously satisfied. From Eqn. (3.4) we can obtain the admission control condition for a single service class by using the definition of global effective envelope as follows:

Definition of Global Effective Envelope

A global effective envelope for an interval of length $\beta$ is a subadditive function $G_N(\tau;\beta,\epsilon)$ that satisfies:

$$Pr[E_N(\tau;\beta) \leq G_N(\tau;\beta,\epsilon), \forall 0 \leq \tau \leq \beta] \geq 1-\epsilon$$

It can be seen that a global effective envelope provides a probabilistic bound for the aggregate traffic $A_N(t,t+\tau)$ for every time interval of length $\tau$ in $\beta$.

Lemma

A set of flows is partitioned into M classes, and each class contains $N_m$ flows with aggregate arrivals $A_{N_m}$. Let $G_{N_m}(\tau;\beta,\epsilon)$ be the global effective envelope for class m. Then the following inequality holds: given x, If $\sum_m G_{N_m}(\tau; \beta, \epsilon) \leq x$, then for all $t$, $$Pr\left[\exists m \exists \tau : \sum_m E_{N_m}(t, t+\tau) > x(\tau)\right] \leq M \cdot \epsilon.$$

We divide flows from the same service class into two categories, i.e., M=2. The first group is the set of flows, N, that are already admitted to the domain. The second group is the new set of flows, K, requesting the QoS from the DS domain. We denote $G_N$ as the global effective envelope of the first group and $G_{new}$ as the global effective envelope of the second group.

Admission Control Condition for a Single Service Class

Using the definition of the global effective envelope and the lemma, from Eqn. (3.4) we have that the arriving traffic has a delay violation with probability $<\epsilon$ if $$G_N(\tau;\beta,\epsilon/2) + G_{new}(\tau;\beta,\epsilon/2) \leq S(\tau+d), \text{ for } 0 \leq \tau \leq B \quad (3.5)$$

If, for the same service class, the set of new flows are regulated by different deterministic envelopes $A_j^*$, each set of flows sharing the same $A_j^*$ require a different envelope $G_{new}^j(\bullet;\beta,\epsilon_j)$, where $$\sum_j \epsilon_j = \epsilon/2.$$

Therefore Eqn. (3.5) becomes:

$$G_N(\tau; \beta, \epsilon/2) + \sum_j G_{new}^j(\tau; \beta, \epsilon_j) \leq S(\tau+d), \text{ for } 0 \leq \tau \leq B \quad (3.6)$$

The CAC in Eqn. (3.5) does not depend on the topology of the domain and the scheduling algorithms within the domain, but the measurement-based traffic-characterized envelopes, which can be measured at an ingress and an egress node in a DS domain.

Constructing the Global Effective Envelope

We consider a set of admitted flows, N. We characterize the distribution of the aggregate traffic using the Central Limit theorem, which does not require the knowledge of the underlying distributions of each flow. An approximate global effective envelope $G_N(\tau;\beta,\epsilon)$ of the aggregate traffic can be obtained from the Central Limit Theorem as follows. From the definition of the global effective envelope, we set $Pr[E_N(\tau;\beta) \geq x, \forall 0 \leq \tau \leq \beta] \approx \epsilon$. For given $\tau_0, \beta$ we then have, for every integer k, $$G_N(\tau;\beta,\epsilon) \approx \alpha[\overline{X((k+1)\tau/k)} + z'\sigma(((k+1)\tau/k)], \forall \tau \in [\tau_0,\beta] \quad (3.7)$$

where $\alpha=1+1/(k+1)$, $z'$ has the approximate value $z'=\sqrt{|\log(2\pi\epsilon')|}$ with $\epsilon'=\tau_0(\alpha-1)\epsilon/\beta k$, and $\overline{X(\tau)}$ and $\sigma^2(\tau)$ are measured average and variance of the amount of aggregate traffic, respectively. We will discuss those measurements in the next section.

From Eqn. (3.4) it can be seen that there are several possible global effective envelopes. For given $\tau_0,\beta$, the method recursively calculates the $k_i$, $\alpha_i$, and $\tau_i$ for $1 \leq i \leq n$, where $\tau_n$ is the first point which is greater than $\beta$. We can therefore obtain n points of a global effective envelope as follows:

$$k_i = z\left(z + \frac{\overline{X(\tau_{i-1})}}{\sigma(\tau_{i-1})}\right), \quad (3.8)$$

$$\alpha_i = 1 + \frac{1}{k_i + 1}, \quad (3.9)$$

$$\tau_i = \alpha_i \tau_{i-1}, \quad (3.10)$$

and, from Eqn. (3.7), $$G_N(\tau_i;\beta,\epsilon) \approx \alpha_i[\overline{X((k_i+1)\tau_i/k_i)} + z'\sigma((k_i+1)\tau_i/k_i)] \quad (3.11)$$

where $z = \sqrt{\log(2\pi\epsilon)}$.

For a set of new flows, one can obtain the global effective envelope of the new flows $G_{new}$ by using the same recursive method as follows. However, instead of using the measurement-based $\overline{X(\tau)}$ and $\sigma^2(\tau)$ in Eqs. (3.8) and (3.11), $\overline{X(\tau)} = K\rho_K\tau$ and $\sigma^2(\tau) = K\rho_K\tau(A_K^*(\tau) - \rho_K\tau)$, where $\rho_K$ is the long-term average and $A_K^*(\tau)$ is a deterministic envelope for each new flow.

Admission Control Condition for Multiple Service Classes

The admission control condition in Eqn. (3.2) does not guarantee that QoS requirements of other service classes using the same ingress-to-egress path will be satisfied if a new set of flows is admitted into the domain. To be able to provide their guarantees, without loss of generality, we assume that the new flows have the highest priority and we test the admission control condition for all the service classes. This can be shown as follows. For each service class we obtain an arriving aggregate traffic envelope $G_{N_q}^q(\tau;\beta, \epsilon_q/2)$ and a service envelope $S^q(\cdot)$. From Eqn. (3.5), new flows, which have an arriving envelope $G_{new}(\tau;\beta,\epsilon_q/2)$, will be admitted if the following condition is satisfied: for all service classes q, $$G_{N_q}^q(\tau;\beta,\epsilon_q/2) + G_{new}(\tau;\beta,\epsilon_q/2) \leq S^q(\tau+d_q), \text{ for } 0 \leq \tau \leq B \quad (3.12)$$

In this section we show our CAC, which depends on the measurement-based envelopes $(G_N(\cdot;\beta,\epsilon)$ and $S(\cdot))$. In the next section we show how to obtain these envelopes.

Measurements of Perspective Envelopes

In this section we show how to measure the characteristic parameters for constructing the global effective envelopes of the arriving aggregate traffic and the service envelope of the departing aggregate traffic for a single service class. First we measure the average and variance of the amount of arriving aggregate traffic, which are used in Eqn. (3.3). We then measure the service envelope of a single service class traffic. At the end of this section we show the admission control algorithm that we will use in the evaluation example below.

Measurement of Aggregate Arriving Envelopes

Figure 5:
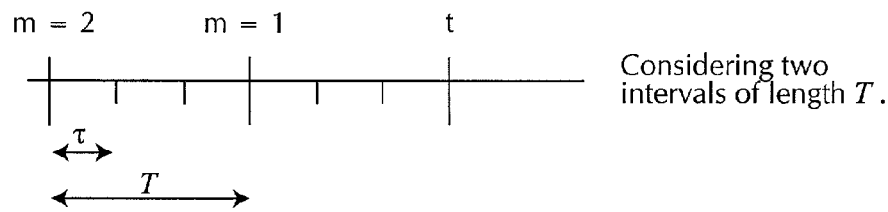
FIG. 5 is a timing diagram illustrating an example of a measured time interval, where $T=3\tau$ and $M=2$.

We are interested in the aggregate characteristic of an arriving traffic at ingress node. To characterize the aggregate traffic as a Gaussian process, we need to measure the first and second moment of the amount of traffic arriving at the ingress node. Let $A_N(t_1,t_2)$ denote the arriving traffic from an aggregate flow in the interval $(t_1,t_2)$. Consider time to be slotted with equal length $\tau$: i.e., for MPEG sources, we can think of $\tau$ as the frame time. We also divide time into M large intervals whose length is T (see FIG. 5). For the $m^{th}$ interval we obtain the bound of an arriving traffic $X_k^m$ as a function of time interval $k\tau$. The bounded amount of the measured traffic over the $m^{th}$ interval of length T from the current time t can be obtained as follows:

$$X_k^m = \max_{0 \leq n \leq (\frac{T}{\tau} - k)} A[t - mT + n\tau, t - mT + (n+k)\tau] \quad (4.1)$$

for m=1, ..., M and $$k = 1, \ldots, \frac{T}{\tau}.$$

Thus for every T time slot, the bounded envelope $X_k^m$ is obtained. From these envelopes we can obtain the average $\overline{X_k}$ and the variance $\sigma_k^2$ of the measured envelopes as follows:

$$\overline{X_k} = \sum_{m=1}^{M} X_k^m \quad (4.2)$$

and $$\sigma_k^2 = \frac{1}{M-1} \sum_{m=1}^{M} (X_k^m - \overline{X_k})^2 \quad (4.3)$$

$\tau$, T, and M are the key parameters for the measurement. An improper choice of $\tau$, T, and M may lead to inaccurately characterizing the arriving aggregate traffic and consequently overestimating the bandwidth required by connections. We varied these parameters in our approach and found that our approach is not very sensitive to such changes. Further discussion of how to choose the parameters can be found in C. Cetinkaya and E. Knightly, Egress Admission Control, In *Proceedings of IEEE Info. Comm.* 2000, Tel Aviv, Israel, March 2000; and D. Tse and M. Grossglauser, Measurement-Based Call Admission Control: Analysis and Simulation, In *Proceedings of IEEE Info. Comm.* 1997, Kobe, Japan, April 1997.

Figure 6A:
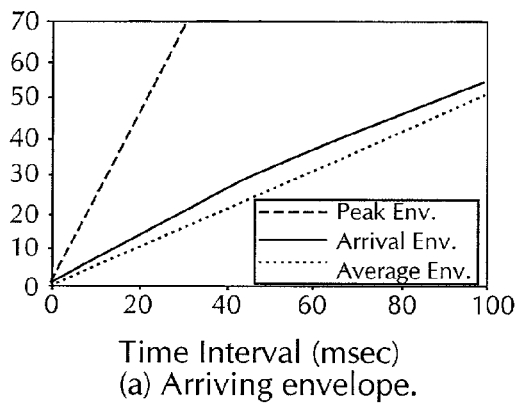
FIGS. 6a and 6b are graphs illustrating measured arriving traffic for time interval ≦100 ms.
Figure 6B:
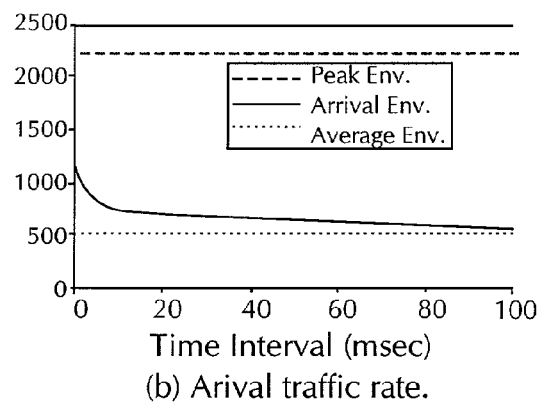

We provide an example of an arrival envelope from a simulation experiment in FIGS. 6a and 6b. FIG. 6a, we plot the amount of arrival aggregate traffic as a function of time interval, while FIG. 6b depicts the arrival aggregate rate as a function of time interval. The simulation consists of 120 multiplexed independent MPEG-2 video traces. These traces are obtained from the movie "Starship Troopers" ("Starship"). Starship has a peak rate of 18.6336 Mbps and an average rate of 4.26 Mbps. The frame rate of Starship is 30 frames per second. This type of traffic has a large peak-to-mean ratio, indicating significant burstiness. From FIG. 6, the arriving envelope and arrival rate are significantly smaller than the peak envelope and peak rate, respectively. This is due to the statistical multiplexing of the traffic aggregate. As the figures show, given a long time interval, the amount of the arriving traffic and its arrival rate decrease toward the average rate.

Measurement of Aggregate Service Envelopes

Consider traffic arriving at a DS domain at an ingress node and leaving at an egress node. For measuring service envelopes, we assume that the clocks in the domain are synchronized. We consider a packet system where packets are serviced at discrete times rather than continuous times. Each packet arriving at the ingress node will be time-stamped. Hence, at the egress node, we are able to determine the ingress-to-egress delay of each packet. Let $a_j$ denote the arriving time and $d_j$ denote the departure time of the $j^{th}$ packet. We consider this traffic to be backlogged whenever at least one packet remains in the system. The backlogging condition can be checked by comparing the arriving and the departure times of packets. Traffic is continuously backlogged for k packets in the interval $[a_j, d_{j+k-1}]$ if $$d_{j+m} > a_{j+m+1}, \text{ for all } 0 \leq m \leq k-2 \qquad (4.4)$$

for $k \geq 1$.

Next, let ServEnv be a list containing $(x, S_j^k(x))$ pairs which represent the amount of time $S_j^k(x)$ required to service x bits when considering the packet j with k backlogged packets. Again consider an interval of length T, which contains the total number of arriving packets n. For packet j, we consider the delay of the packet and also the delay of the packets backlogged after this packet. We thus can define $S_j^k(x)$ as follows:

$$S_j^k(x) = d_{j+k-1} - a_j \qquad (4.5)$$

for all $k \geq 1$ which satisfy the backlogging condition.

A bounded service envelope can be obtained as follows:
Initialize (ServEnv)
for packet j=1 to n
  $S_j^1 <- d_j - a_j$
  $x(S_j^1) <-$ Size (packet (j))
  k<-2
  while $(d_{j+k-2} > a_{j+k-1})$
    $S_j^k <- d_{j+k-1} - a_j$
    $x(S_j^k) <- x(S_j^{k-1}) +$ Size (packet (j+k-1))
    k<-k+1
  Merge (ServEnv, $(x(S_j^k), S_j^k)$ $\forall k$, ServEnv)
for i=(Length(ServEnv)-1) to 0
  if $(x[i] < x[i-1])$
    Remove $(x[i-1], S[i-1])$
Using ServEnv to plot a service envelope.

Table I Bounded Service Algorithm

Figure 7A:
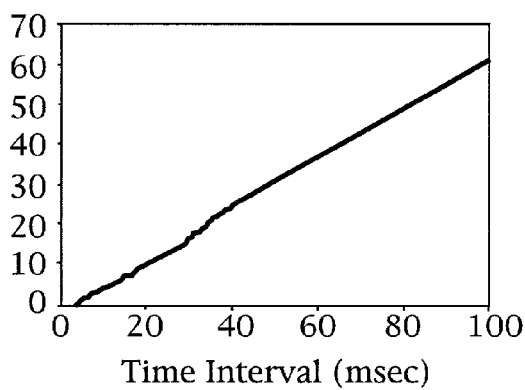
FIGS. 7a and 7b are graphs illustrating measured service envelope for time interval ≦100 ms.
Figure 7B:
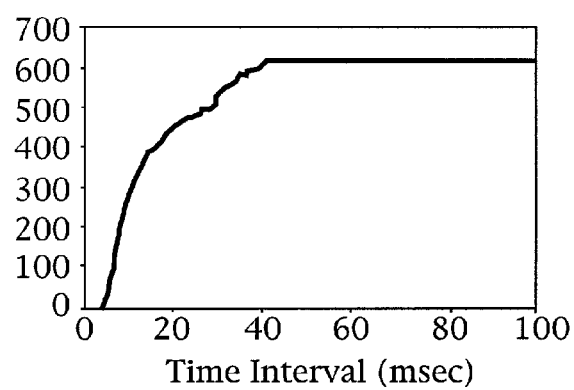

FIG. 7a shows a service envelope of an aggregate of departing traffic obtained from a simulation. The simulation consists of a node with a 622 Mbps link and the same number of sources (Starship) used for FIGS. 6a and 6b. It is noted that the envelope is an increasing function. In addition, FIG. 7b depicts the slope of the service envelope. The slope of the envelope indicates variation of the service rate for the burstiness of the arriving aggregate flows.

Admission Control Algorithm using Local Effective Envelopes

I. To request the QoS for its traffic from a DS domain, the user submits to a BB its traffic characterization containing $A_j^*(\tau)$, QoS requirements, d and $\epsilon$.

II. CAC constructs a local effective envelope, $L_{new}$, based on the submitted parameters by using Eqs. (7) and (8).

III. CAC then uses the measurement of the average and variance of arriving traffic to construct local effective envelopes for admitted flows, $L_{N_q}^q$, from Eqn. (4).

IV. CAC finally makes an admission control decision based on $L_{new}$, $L_{N_q}^q$, and $S^q$ obtained from the previous section. The request is accepted if the condition in Eqn. (9) is true.

Admission Control Algorithm using Global Effective Envelope

I. To request the QoS for its traffic from a DS domain, the user submits to a BB its traffic characterization containing $A_j^*(\tau)$, QoS requirements, d and $\epsilon$.

II. CAC constructs a global effective envelope, $G_{new}$, based on the submitted parameters by using Eqs. (3.8)–(3.11).

III. CAC then uses the measurement of the average and variance of arriving traffic (obtained from Eqs. (4.2) and (4.3) respectively) to construct global effective envelopes for admitted flows, $G_{N_q}^q$, from Eqs. (3.8)–(3.11).

IV. CAC finally makes an admission control decision based on $G_{new}$, $G_{N_q}^q$, and $S^q$ obtained from the previous section. The request is accepted if the condition in Eqn. (3.12) is true.

Evaluation and Simulation Results

In this section, we evaluate the effectiveness of our CAC condition. We consider a case where all flows are homogeneous, i.e., all flows satisfy the same deterministic envelope and require the same delay QoS guarantee from a DS domain. Starship is again used as a traffic source. For simulations, we set the probability of delay violation $\epsilon = 10^{-6}$ and vary the delay bound requirement d. We consider a DS domain, which has an egress node with a link capacity of 622 Mbps (C=622 Mbps for all simulations). All links in the domain have the same capacity as the egress link. Each node has a FIFO scheduler. We consider three scenarios where the number of nodes and amount of cross traffic in the domain are changed as follows:

I. The DS domain consists of a node without any cross traffic (see FIG. 8a).

II. The DS domain consists of two nodes without any cross traffic (see FIG. 8b).

III. The DS domain consists of three nodes with some cross traffic (see FIG. 8c).

Note that in configuration III, we use 40 flows of Starship as cross traffic requesting the same QoS requirements as the main traffic.

We will evaluate our approach ('Approach') by using the CAC algorithm described above. As benchmarks for our approach, we also investigate two of the following approaches and a set of simulations ('Simulation'). First, we consider average rate allocation ('Average Rate'), where the maximum number of admissible flows is determined by the link capacity divided by the long-term average rate of each flow and, therefore, the average link utilization for this approach is unity. Second, we consider the peak rate allocation ('Peak Rate'), where the maximum number of admissible flows is determined by the link capacity divided by the peak rate of each flow. For simulation purposes, each flow starts randomly sending traffic into the DS domain. Many simulations are performed. The average result of the simulation is presented. We compare the average link utilization, $U_{ave}$, obtained from each approach. $U_{ave}$ is defined as follows:

$$U_{ave} = \frac{\sum_{j=1}^{N} \rho_j}{C}$$

where N is the number of connections admitted to the domain, $\rho_j$ is the long-term average rate of each flow, and C is the link capacity at the egress node.

Figure 8A:
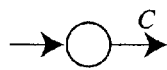
FIGS. 8a, 8b, and 8c are graphs of average link utilization as a function of delay bound for three different scenarios, for delay bound d≦100 ms.
Figure 8A:
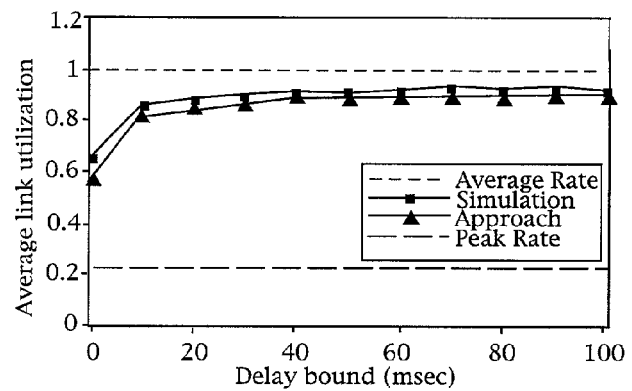
Figure 8B:
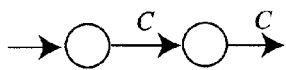
Figure 8B:
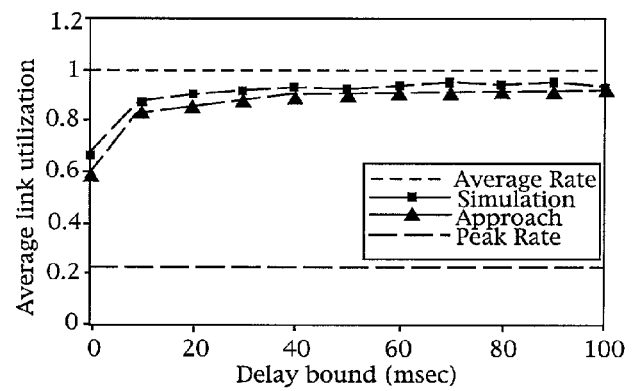
Figure 8C:
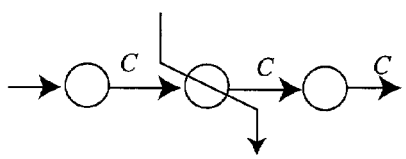
Figure 8C:
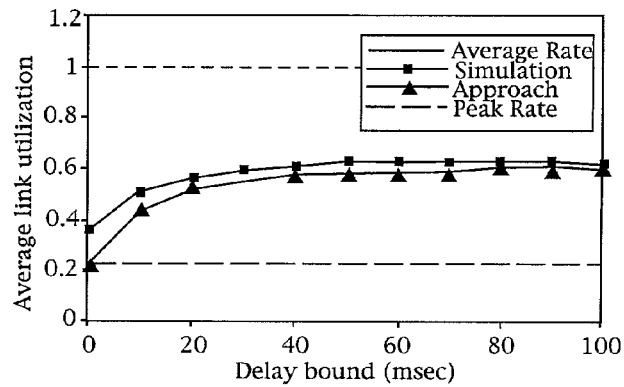

FIGS. 8a–8c show the three scenarios we investigate and the corresponding results where the average link utilization is a function of the delay bound. From the results, the link utilization obtained by the simulations and our approach is considerably higher than the one obtained by the peak rate allocation. This shows that the simulations and our approach can exploit the multiplexing gain from the traffic aggregate and, hence, yield high link utilization. For example, from FIG. 8a, for the delay bound d=10 ms, the simulation and our approach yield 86% of the link utilization while the peak rate allocation can only achieve 82%. In addition, the results show that our approach can accurately characterize arriving and departing aggregate traffic. FIGS. 8b–8c show that our approach can determine an accurate condition of the domain without the knowledge of the underlying topology and cross traffic, and yield link utilization close to simulation results.

From the foregoing it will be appreciated that the measurement-based admission control algorithm exploits global effective envelopes and service envelopes to accurately characterize arriving and departing aggregate traffic. The CAC algorithm is tunable through a set of parameters. The algorithm is scalable and can support a variety of service classes. We showed the effectiveness of the CAC algorithm by comparing the link utilization obtained by the algorithm to results from simulations. While the invention has been described in its presently preferred form, it will be understood that the principles of the invention may be applied to many applications and that implementation details of the algorithm can be varied without departing from the spirit of the invention as set forth in the claims.

What is claimed is:

1. A method of performing admission control for traffic flows that encompass two or more service classes in a network, comprising:

determining for each service class a first effective envelope associated with arriving traffic entering said network, where the first effective envelope is a function over a time interval that defines an upper bound on aggregate arriving traffic from a given service class;

determining for each service class a second effective envelope associated with admitted traffic currently in said network, where the second effective envelope is a function over a time interval that defines an upper bound on admitted traffic from a given service class;

determining for each service class a service curve by measuring departing traffic leaving said network;

testing an admission control condition for each of the service classes, where the admission control condition is satisfied when the sum of the first and second effective envelopes for a given service class is less than or equal to the service curve for the given service class; and admitting said arriving traffic when the admission control condition is satisfied for each of the service classes.

2. The method of claim 1 wherein said first and second effective envelopes are global effective envelopes.

3. The method of claim 1 wherein said second effective envelope is a global effective envelope determined as a function of measured average and variance of an aggregate of admitted traffic.

4. The method of claim 1 wherein said first and second effective envelopes are local effective envelopes.

5. The method of claim 1 wherein said second effective envelope is a local effective envelope determined as a function of measured average and variance of an aggregate of admitted traffic.

6. The method of claim 1 wherein said first effective envelope is based on an aggregate of arriving traffic.

7. The method of claim 6 wherein said aggregate is determined by measuring an aggregate arrival flow at plural time intervals and by calculating average and variance of said aggregate arrival flow.

8. The method of claim 1 wherein said second effective envelope is recursively calculated.

9. The method of claim 1 wherein said service curve is determined based on measured packet delay.

10. The method of claim 1 wherein said service curve is determined by developing a list of pairs representing the amount of time required to service one packet of information and the number of backlogged packets of information, and using said list to determine a bounded service envelope.

* * * * *